(12) United States Patent
Fingler et al.

(10) Patent No.: US 6,435,727 B1
(45) Date of Patent: Aug. 20, 2002

(54) CONNECTOR FOR FIBER OPTIC CABLE

(75) Inventors: Laurence H. Fingler, King Township; L. Scott Fingler, Schomberg, both of (CA); Geoffrey P. Laycock, Bristow, VA (US)

(73) Assignee: Fiber Connections, Inc., Schomberg (CA)

(*) Notice: Subject to any disclaimer, the term of this patent is extended or adjusted under 35 U.S.C. 154(b) by 0 days.

(21) Appl. No.: 09/498,080

(22) Filed: Feb. 4, 2000

Related U.S. Application Data

(60) Provisional application No. 60/118,899, filed on Feb. 5, 1999.

(51) Int. Cl.$^7$ ................................................. G02B 6/36
(52) U.S. Cl. .................... 385/53; 385/137; 385/138; 385/139; 439/536
(58) Field of Search ........................ 385/53, 138, 136, 385/137; 439/536, 404

(56) References Cited

U.S. PATENT DOCUMENTS 5,626,490 A * 5/1997 Pitts et al. ................ 439/417
6,200,160 B1 * 3/2001 Drexler et al. ............ 439/536

* cited by examiner

*Primary Examiner*—Cassandra Spyrou
*Assistant Examiner*—Fayez Assaf
(74) *Attorney, Agent, or Firm*—Connolly Bove Lodge & Hutz LLP

(57) ABSTRACT

A wall connector for fibre optic cable includes a housing be accommodated in a wall opening. A first receptacle for a multi-fiber optic cable is disposed in the housing. A plurality of second receptacles for fibre optic cables are also disposed in the housing. Each of the second receptacles has a fiber optic cable connection to the first receptacle and is accessible via a forward face of the housing to receive a fibre optic cable connector.

21 Claims, 4 Drawing Sheets

CONNECTOR FOR FIBER OPTIC CABLE

CROSS-REFERENCE TO RELATED APPLICATION

This application claims the benefit of the filing date of U.S. Provisional Application Serial No. 60/118,899, filed Feb. 5, 1999.

FIELD OF THE INVENTION

The present invention relates to a connector for fibre optic cable, and in particular to a wall receptacle or socket for connection of multiple fibre optic cables to a multi-fibre optic cable from a network, remote location or other source.

BACKGROUND OF THE INVENTION

Buildings are traditionally provided with a variety of wall receptacles, typically receptacles for two or three prong electrical plugs and receptacles adapted to receive jacks, connectors or the like for connection to telephone or other signal transmissions systems. For instance, such receptacles could be adapted to receive jacks or computer cable connections for transmission of information from one location to a remote location, or for connection to local area networks or other networking systems. These communication and transmission systems utilize copper or other metallic wiring suitable for transmission of electricity or electrical signals. Techniques for establishing connections between wiring for electricity or electrical signals are well known, and in many instances are not critical in nature.

Fibre optic cable is used to communicate digital and analog information by the transmission of pulses of light. Signal strength can be weakened by losses at joints or connections due to reflection or absorption of light at the joints between the fibre optic cable, such connections being substantially more critical than connections for electricity or electrical signals. It is desirable to reduce the losses in fibre optic cable either by reducing the number of joints in the fibre optic transmission line or by ensuring that any joints or connections are of the highest optical quality.

While it is possible to install fibre optic cable in buildings, there is limited flexibility and convenience in adapting existing buildings for the use of fibre optic cable. Retrofitting existing buildings with fibre optic cable to accommodate changes in the number and types of devices, which use optic fibre, either requires structural damage or changes to the building or to the walls within the building. It is anticipated that such difficulties will become more severe as the use of fibre optic cable becomes more common. The above difficulties can be alleviated by installing multi-fibre optic cable that terminates in convenient locations, and which is adapted for connection to other optical cable.

There is a need for flexibility and the ability to adapt existing offices, or other locations, for the use of devices utilizing fibre optic cable, and to have the flexibility to be able to vary and add devices from time to time, and to be able to do so with minimal effort. It is therefore an object of the present invention to provide a novel wall connector for fibre optic cable.

There is a need for flexibility and the ability to adapt existing offices, or other locations, for the use of devices utilizing fibre optic cable, and to have the flexibility to be able to vary and add devices from time to time, and to be able to do so with minimal effort. It is therefore an object of the present invention to provide a novel wall connector foar fibre optic cable.

SUMMARY OF THE INVENTION

The present invention provides a wall connector adapted for the connection of fibre optic cables to a multi-fibre optic cable, and which is adapted to be inserted in and attached to a wall.

Accordingly, one aspect of the present invention provides a wall connector for fibre optic cable, comprising:

a housing to be accommodated in a wall opening;

a first receptacle in said housing to receive a multi-fibre optic cable; and a plurality of second receptacles accommodated by said housing, each of said second receptacles having fibre optic cable connections to said first receptacle and being accessible via a forward face of said housing to receive a fibre optic cable connector.

In a preferred embodiment, the wall connector includes a cover plate surrounding the housing that is removably attached to the housing by threaded fasteners. The second receptacles are adapted to receive plug-in type fibre optic cable connectors.

It is also preferred that the second receptacles are arranged in vertically spaced rows and are positioned on downwardly facing surfaces of the housing.

BRIEF DESCRIPTION OF THE DRAWINGS

An embodiment of the present invention will now be described more fully with reference to the accompanying drawings, in which.

DETAILED DESCRIPTION OF THE PREFERRED EMBODIMENT

Figure 1:
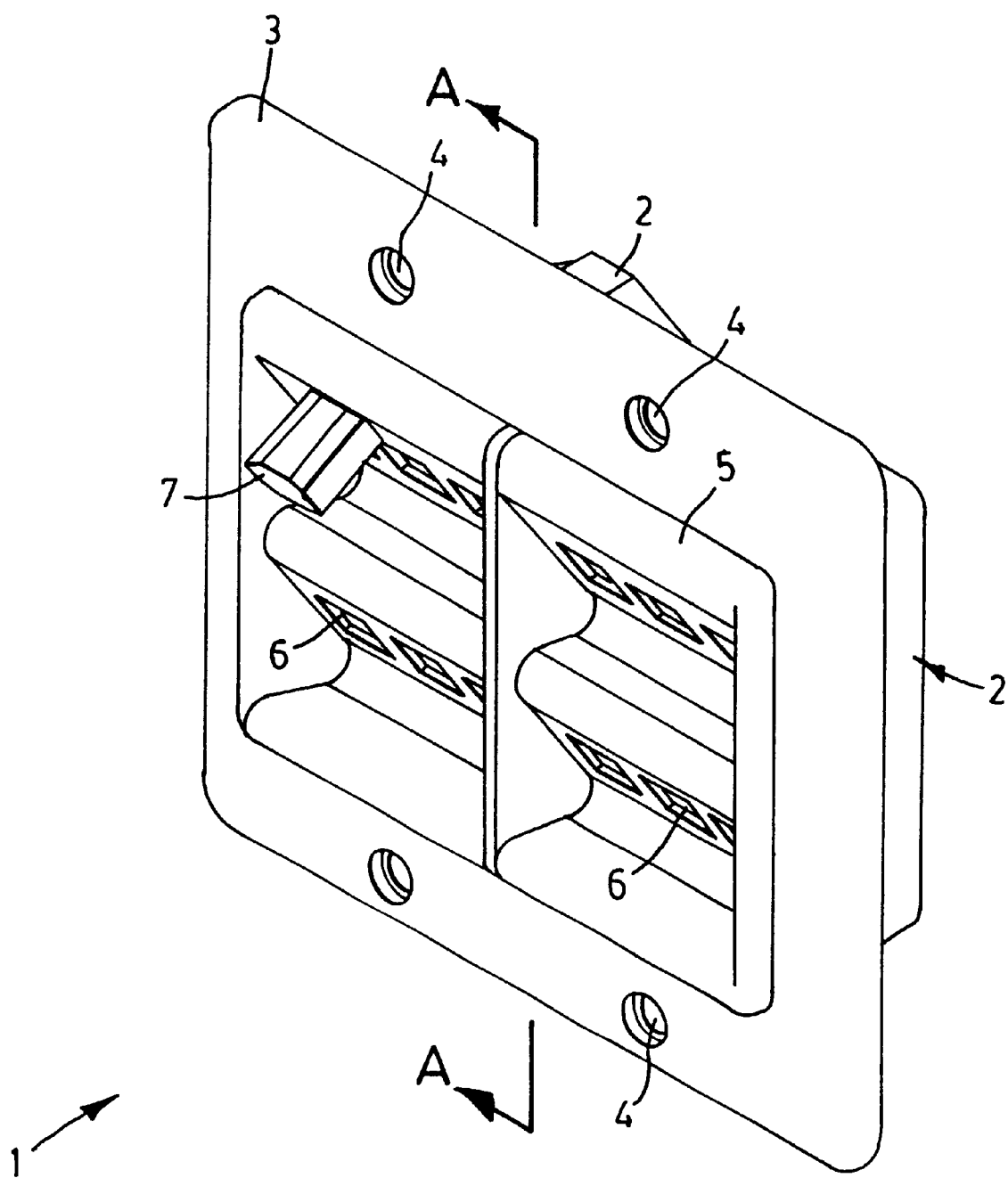
FIG. 1 is a perspective view of a fibre optic cable wall connector in accordance with the present invention.

Turning now to FIG. 1, a fibre optic cable wall connector, generally indicated by reference numeral 1 is shown. The wall connector is adapted to be accommodated in a wall similar to a conventional electrical outlet to allow fibre optic cables extending to devices to be coupled to a multi-fibre optic cable running behind the wall. Wall connector 1 includes a housing 2 and a cover plate 3 surrounding the housing 2. Cover plate 3 has a plurality of screw holes 4 therein, of which four are shown, and is detachable from housing 2, in a manner similar to that of an electrical outlet cover plate. Screw holes 4 accommodate threaded fasteners used to attach the cover plate 3 to the housing 2.

Figure 2:
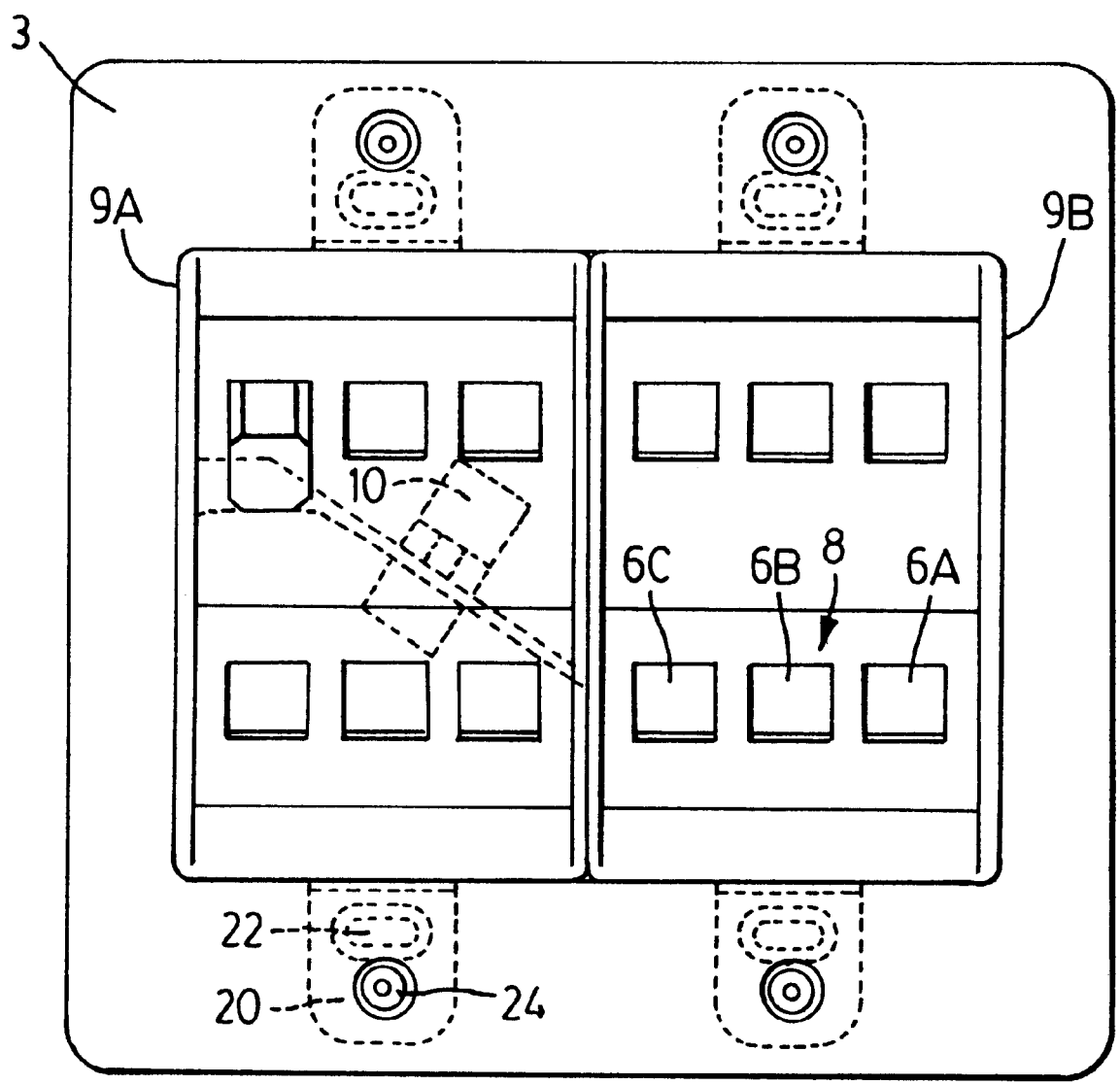
FIG. 2 is a front elevational view of the fibre optic cable wall connector of FIG. 1.
Figure 3:
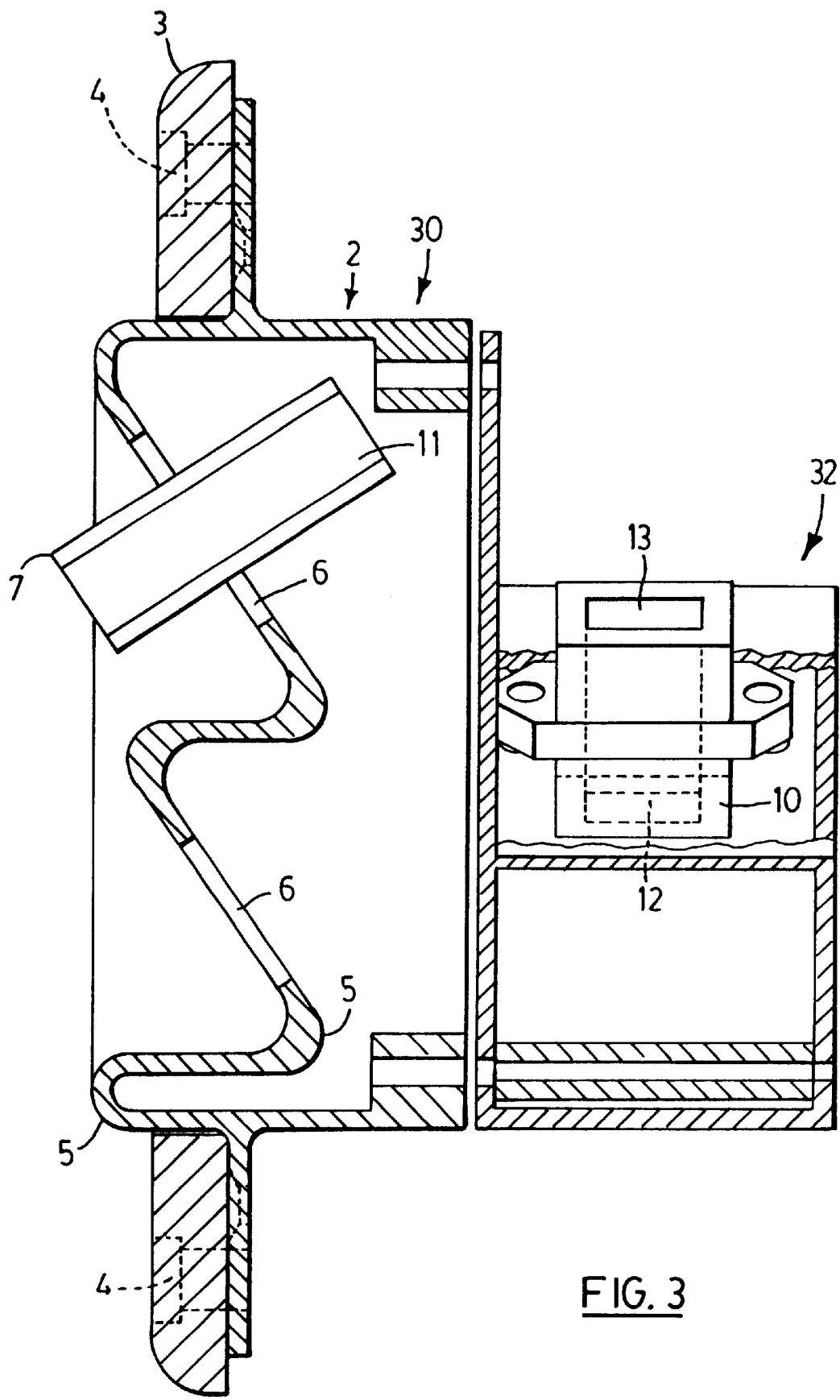
FIG. 3 is a cross-sectional view of the fibre optic cable wall connector of FIG. 1 taken through line A—A.
Figure 4:
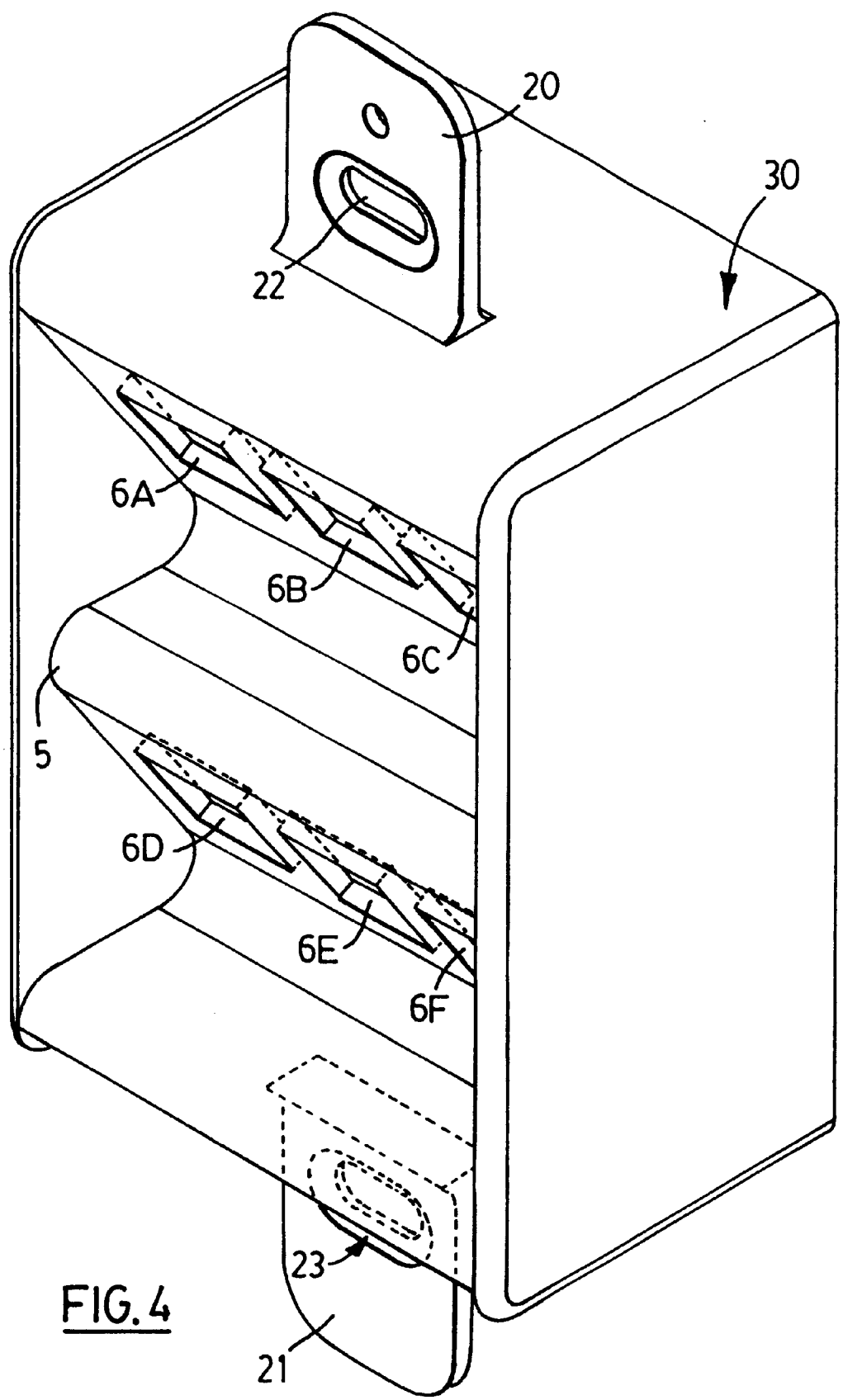
FIG. 4 is a perspective view of a housing component of the fibre optic cable wall connector FIG. 1.

Housing 2 is best illustrated in FIGS. 2 to 4 and includes a pair of housing components, indicated as 9A and 9B, in a juxtaposed position. This is primarily for convenience of manufacture, but in the preferred embodiment, it relates to the particular fibre optic connectors that are used in construction of the wall connector, as discussed herein. It is understood, however, that the wall connector 1 could have one such housing, or more than two housing components. The housing components 9A and 9B permit flexibility in installation.

Each of the housing components 9A and 9B includes front and rear parts 30 and 32 releasably attached by fasteners. An upper attachment plate 20 having a screw slot 22 and a lower attachment plate 21 having a screw slot 23 are provided on the front part 30. The screw slots 22 and 23 accommodate threaded fasteners to allow the housing components 9A and 9B to be secured to studs or other supporting structures in the wall. The attachment plates 20 and 21 also include threaded screw slots 24, that align with the screw holes 4 in the cover plate 3 in order to receive threaded fasteners.

The front part 30 of each housing component 9A and 9B has a receptacle plate 5 that extends forwardly of the cover plate 3. The receptacle plates are generally sinusoidal in configuration and each presents a pair of downwardly facing surfaces that accommodate a plurality of female receptacles 6, arranged in groups. In the illustrated embodiment, each downwardly facing surface accommodates three side-by-side female receptacles identified by reference numerals 6A, 6B and 6C. Each receptacle 6 is adapted to receive a two-fibre, MTRJ fibre optic cable connector 7 at the end of a two-fibre, fibre optic cable. The shape of each receptacle plate 5 is convenient to accommodate a plurality of side-by-side MTRJ connectors, into the female receptacles 6 while maintaining a physical separation of the connectors 7 and to facilitate insertion and removal of the connectors 7 from the female receptacles 6. However, it will be appreciated that the shape of the receptacle plates may be varied.

The rear part 32 of each housing component 9A and 9B includes a fibre optic cable connector 10 disposed behind the female receptacles 6. The fibre optic cable connector 10 in the preferred embodiment is an MTP type connector and has a fibre optic cable connector inlet 13 to receive a multi-fibre optic cable (not shown) extending to a remote source. The fibre optic cable connector 10 also has a connector outlet 12. A fibre optic cable (not shown) connects each female receptacle 6 to the connector outlet 12 to couple pairs of optic fibres of the multi-fibre optic cable to respective female receptacles. As is well known, an MTP connector connects a twelve-fibre optic cable to six two-fibre optic cables. Two-fibre optic cables are standard fibre optic cables for transmission of digital or analog information, and twelve-fibre optic cables are standard multi-fibre optic cables.

Although the wall connector 1 has been described as having female receptacles 6 exposed through the cover plate to receive MTRJ connectors, those of skill in the art will appreciate that the wall connector can include receptacles designed to receive other types of connectors including female connectors. Also, other multi-fibre optic cable connectors can be used to allow the wall connector to accommodate multi-fibre optic cables with different numbers of fibres and to connect the multi-fibre optic cables to the receptacles 6.

As will be appreciated, the present invention provides a wall connector that is very flexible in use, and adapted to receive optical cable extending from a number of devices to connect the devices to remote locations or a network via a multi-fibre optic cable. It does not require use of complex or delicate connection techniques.

Although a preferred embodiment of the present invention has been described, those of skill in the art will appreciate that variations and modifications may be made without departing from the spirit and scope thereof as defined by the appended claims.

We claim:

1. A wall connector for fibre optic cable, comprising:
  a housing to be accommodated in a wall opening and having a forwardly facing receptacle plate, said receptacle plate having a generally sinusoidal configuration to define a plurality of vertically spaced, downwardly inclined surfaces;
  a first receptacle in said housing to receive a multi-fibre optic cable; and
  a plurality of second receptacles accommodated by said housing, said second receptacles being arranged in rows with each row of second receptacles being located on a respective one of said downwardly inclined surfaces, each of said second receptacles having fibre optic cable connections to said first receptacle and being accessible via said respective downwardly inclined surface to receive a fibre optic cable connector.

2. The wall connector of claim 1 further including a cover plate surrounding said housing and attached thereto.

3. The wall connector of claim 2 wherein said cover plate is removable from the housing.

4. The wall connector of claim 3 wherein said second receptacles are female receptacles.

5. The wall connector of claim 3 wherein said second receptacles are adapted to receive plug-in type fibre optic cable connectors.

6. The wall connector of claim 3 wherein said first receptacle is an MTP type connector.

7. The wall connector of claim 5 wherein said second receptacles are adapted to receive MTRJ connectors.

8. The wall connector of claim 1 wherein said receptacle plate includes a pair of downwardly inclined surfaces.

9. The wall connector of claim 8 wherein each downwardly inclined surface accommodates three side-by-side second receptacles.

10. The wall connector of claim 9 wherein said second receptacles are adapted to receive MTRJ connectors.

11. The wall connector of claim 1 wherein said housing includes at least two side-by-side housing components, each housing component including a first receptacle, a plurality of second receptacles and a receptacle plate.

12. The wall connector of claim 11 wherein said second receptacles are adapted to receive plug-in type fibre optic cable connectors.

13. The wall connector of claim 12 wherein said second receptacles are adapted to receive MTRJ connectors.

14. The wall connector of claim 12 wherein each said first receptacle is an MTP type connector.

15. A wall connector for fibre optic cable, comprising:
  a housing to be accommodated in a wall opening and having a forwardly facing receptacle plate, said receptacle plate presenting a plurality of vertically spaced, inclined surfaces;
  a first receptacle in said housing to receive a multi-fibre optic cable; and
  a plurality of second receptacles accommodated by openings in said inclined surfaces, said second receptacles being arranged in rows with each row of second receptacles being accommodated by a respective one of said inclined surfaces, each of said second receptacles having fibre optic cable connections to said first receptacle and being accessible via said respective inclined surface to receive a fibre optic cable connector.

16. The wall connector of claim 15 further including a cover plate surrounding said receptacle plate.

17. The wall connector of claim 16 wherein said second receptacles are female receptacles adapted to receive plug-in type fibre optic cable connectors.

18. The wall connector of claim 17 wherein said first receptacle is an MTP type connector.

19. The wall connector of claim 18 wherein said second receptacles are adapted to receive MTRJ connectors.

20. The wall connector of claim 15 wherein each inclined surface accommodates three side-by-side second receptacles.

21. The wall connector of claim 15 wherein said housing includes at least two side-by-side housing components, each housing component including a first receptacle, a plurality of second receptacles and a receptacle plate.

* * * * *